(12) United States Patent
Delmas et al.

(10) Patent No.: US 6,347,913 B2
(45) Date of Patent: Feb. 19, 2002

(54) GEOTEXTILE STRUCTURE FOR FILTRATION

(75) Inventors: Philippe Delmas, Fontenay le Fleury; Olivier Artieres, Sartrouville, both of (FR)

(73) Assignee: BIDIM Grosynthetics S.A. (FR)

( * ) Notice: Subject to any disclaimer, the term of this patent is extended or adjusted under 35 U.S.C. 154(b) by 0 days.

(21) Appl. No.: 09/132,344

(22) Filed: Aug. 12, 1998

(30) Foreign Application Priority Data

Aug. 13, 1997 (FR) ............................................. 97 10325

(51) Int. Cl.$^7$ ........................... E02D 17/20; E02B 11/00
(52) U.S. Cl. ........................ 405/302.7; 404/82; 405/36; 405/52; 405/258.1
(58) Field of Search ............................. 405/36, 45, 43, 405/258, 52, 258.1, 302.6, 302.7; 404/81, 82

(56) References Cited

U.S. PATENT DOCUMENTS

| | | | |
|---|---|---|---|
| 3,003,643 A | * 10/1961 | Thomas | 405/45 X |
| 4,288,321 A | * 9/1981 | Beane | 405/45 X |
| 4,629,651 A | * 12/1986 | Davis | 428/247 |
| 5,190,406 A | * 3/1993 | Shannonhouse et al. | 405/129 |
| 5,651,641 A | * 7/1997 | Stephens et al. | 405/258 |
| 6,135,672 A | * 10/2000 | Davidson | 405/19 |

FOREIGN PATENT DOCUMENTS

| | | |
|---|---|---|
| DE | G936444D E | 12/1993 |
| EP | 0390755 | 10/1990 |
| EP | 0459203 A1 | 12/1991 |
| EP | 0564799 A2 | 10/1993 |

OTHER PUBLICATIONS

Proceedings of Geofilters '96, Montreal, May 1996, pp. 565–680.

* cited by examiner

Primary Examiner—David Bagnell
Assistant Examiner—Tara L. Mayo
(74) Attorney, Agent, or Firm—Howrey Simon Arnold & White, LLP

(57) ABSTRACT

A geotextile structure for filtering liquid from soil includes a lower layer of geotextile material for contacting soil for filtration thereof. The lower layer presents in its thickness a number of constrictions n included between 15 and 40, and is made of synthetic filaments or fibers presenting a count D wherein D is measured in units of decitex. An upper layer of geotextile material provides mechanical protection of the lower layer. The upper layer presents in its thickness constrictions more open than the constrictions of the lower layer to avoid clogging of the lower layer. The upper layer is made of synthetic filaments or fibers presenting a count at least equal to 2D. The upper and lower layers are bonded to each other.

5 Claims, 1 Drawing Sheet

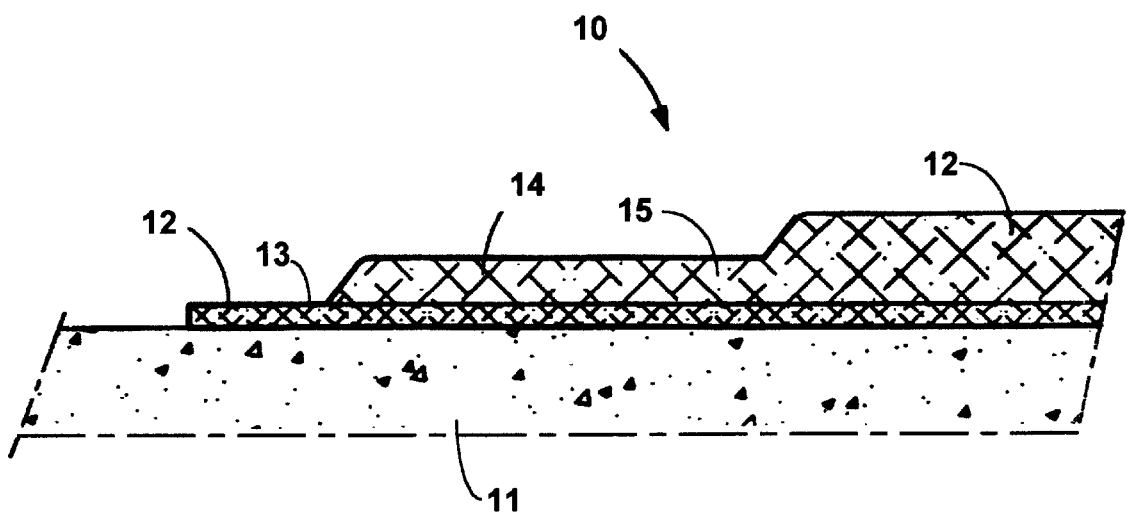

GEOTEXTILE STRUCTURE FOR FILTRATION

Applicants hereby claims purusant to 35 U.S.C. § 119 the priority of French Patent Application No. 97 10325 filed in the French Patent Office on Aug. 13, 1997.

FIELD OF THE INVENTION

The present invention relates to a geotextile structure for filtration.

More precisely, the invention relates to a geotextile structure performing the standard functions for such structures, i.e. the stabilization of soils or of other equivalent materials and which presents, moreover, such filtration properties as to allow passage only of liquids impregnating the soil and not the soil itself or other types of waste.

BACKGROUND OF THE INVENTION

Geotextile stucture used for filtering soils are well known. They are most often constituted by woven or non-woven layers of filaments or of fibers of synthetic materials such as polypropylene, the presence of this structure in contact with the soil, or buried in the soil, ensuring stability thereof.

The present invention concerns a structure of this type which, moreover, presents characteristics such that they allow a filtration of the liquids present in the ground.

The technique of filtration with the aid of geotextiles has existed for a long time. The principle consists in retaining the soil to be filtered while allowing the water to pass without pressure drop or with a pressure drop which is a low as possible. Taking into account the granulometry of natural soils, it is not possible to retain all the particles of the soil. This is why the object of the present dimensioning of such filters is only to retain the skeleton of the soil. These are the largest particles of the soil which may retain the finest particles by creation of an "auto-filter" within the soil. This mechanism therefore supposes that, in the geotextile, the finest particles pass therethrough without clogging it. The same applies for the particles of soil in suspension which may come into contact with the geotextile when employed, for example in the presence of mud.

It is generally admitted that the best performances are obtained by needled geotextiles, due to their three-dimensional behaviour. However, as has been demonstrated, the geotextile product must, in order to perform its functions of filtration, present a minimum number of constrictions (i.e. of spaces created by three filaments or more through which the particle of soil must pass) in its thickness, in order to have a high statistical homogeneity of local filtration openings.

However, it has proved that, in order to withstand the aggressions when such a filtration geotextile is used, it is necessary to increase the mass of the product used to obtain the necessary thickness after the damage resulting from employment. This increase in mass, combined with the minimum number of constrictions necessary, has for an effect to considerably increase the risk of internal clogging of the product. It will be appreciated that such a clogging considerably reduces the filtering properties of the geotextile texture.

It is an object of the present invention to provide a geotextile structure which effectively perfoms the desired function of filtration while allowing a sufficient mechanical protection of the structure to ensure integrity thereof when put to use.

SUMMARY OF THE INVENTION

To attain this object, according to the invention, the geotextile structure for filtration is characterized in that it comprises:

a lower layer of geotextile material for filtration presenting a number of constrictions n included between 15 and 40 and made of synthetic filaments or fibers presenting a count D (decitex); and an upper layer of geotextile material for protection made of synthetic filaments or fibers presenting a count at least equal to 2D (decitex), said upper and lower layers being bonded to each other.

For example, this count is equal to 4D (dexitex).

It will be appreciated that, thanks to the combination of the lower layer for filtration, which is optimized for the purposes of this function, the overall structure effectively performs the function of filtration under the desired conditions. It will also be appreciated that, thanks to the upper layer of synthetic material which presents a mass adapted to the desired resistance, the lower filtration layer is mechanically protected while avoiding the risks of clogging of the filtration layer.

According to a preferred characteristic, the number of constrictions of the lower layer is included between 20 and 35.

Likewise preferably, the count of the filaments of the upper layer is included between 3D (decitex) and 4D (decitex).

BRIEF DESCRIPTION OF THE DRAWINGS

The invention will be more readily understood on reading the following description of a geotextile structure performing the function of filtering, with reference to the accompanying drawings, in which:

The single FIGURE shows in vertical section an embodiment of the geotextile filtering structure.

DESCRIPTION OF PREFERRED EMBODIMENT

Referring now to the drawings, this single FIGURE shows a portion of the geotextile structure 10 disposed on a soil 11 to be filtered. According to an essential feature of the invention, the geotextile structure is constituted by a first lower geotextile layer 12 performing the function of filtration and an upper layer 14, likewise made of geotextile and essentially performing a function of mechanical protection of the lower filtration layer 12.

The lower layer 12 is optimized in order to optimally perform the function of filtration so that this layer allows the liquids to pass and retains the solid particles forming the skeleton of the soil. To that end, the geotextile layer 12 is made from synthetic filaments or fibers and in particular of polypropylene, so that this layer presents in its thickness a number of constrictions 13 included between 15 and 40 and preferably between 20 and 35. As has already been indicated, the number of constrictions is the number of spaces created by the filaments of the three-dimensional structure between the upper face and the lower face thereof. Experiments show that, for this number of constrictions included between 20 and 35, an optimal effect of filtration of the liquid is obtained. Likewise preferably, the lower layer is made of filaments corresponding to a count advantageously included between 3 and 5 decitex.

The upper layer 14 which essentially performs a function of mechanical protection of the lower layer 12 is also made with synthetic filaments or fibers, particularly of polypropylene, which present constrictions 15 much more open than the portion of the lower layer 12. In addition, this layer 14 is made from filaments whose diameter is very substantially larger than that of the lower layer. The count (in decitex) of these filaments is of the order of 2 to 4 times greater than that of the filaments of the lower layer and preferably of the order of 3 to 4 times more. In other words, the geotextile structure constituting the upper layer 14 advantageously presents a decitex number included between 12 and 20.

By way of example, the lower filtering layer 12 presents a thickness of between 1.5 and 2.5 mm. Similarly, the upper layer 14 presents a thickness preferably included between 1.5 and 6 mm. The two layers are bonded together during manufacture.

As shown in the single FIGURE, it is possible to provide for the upper layer 14 a mass and a thickness adapted to the desired level of protection. For example, in the zone where it must withstand an enrockment in the case of protecting a river, a lake or a maritime structure, the thickness may be greater in zone 16.

It follows from the above description that the geotextile structure 10 comprises a lower layer 12 which is optimalized to perform its function of filtration while the upper layer 14 serves for mechanical protection. The upper layer 14 presents constrictions which are more open with respect to the lower layer, so that, despite the substantially greater diameter of the filaments which constitute it, it does not risk producing the phenomenon of clogging, which situation would prevent the lower layer from performing its function of filtration.

What is claimed is:

1. A geotextile structure for filtering liguid from soil, comprising:

a lower layer of geotextile material for contacting soil for filtration thereof, the lower layer presenting in its thickness a number of constrictions n included between 15 and 40 and made of synthetic filaments or fibers presenting a count D wherein D is measured in units of decitex; and an upper layer of geotextile material for mechanical protection of the lower layer, presenting in its thickness constrictions more open than the constrictions of the lower layer for avoiding clogging of the geotextile structure, and made of synthetic filaments or fibers presenting a count at least equal to 2D, said upper and lower layers being bonded to each other.

2. The geotextile structure of claim 1, wherein the number of constrictions of the lower layer is included between 20 and 35.

3. The geotextile structure of claim 1, wherein the count of the filaments of the upper layer is included between 3D and 4D.

4. The geotextile structure of claim 1, wherein the lower layer corresponds to about 3 to 5 decitex and the upper layer corresponds to about 12 to 20 decitex.

5. The geotextile structure of claim 1, wherein said upper layer presents a mass adapted to a desired resistance.

* * * * *

UNITED STATES PATENT AND TRADEMARK OFFICE
CERTIFICATE OF CORRECTION

PATENT NO. : 6,347,913 B2
DATED : February 19, 2002
INVENTOR(S) : Philippe Delmas and Olivier Artietres It is certified that error appears in the above-identified patent and that said Letters Patent is hereby corrected as shown below:

<u>Title page,</u>
Item [73], Assignee, delete "Grosynthetics" and insert -- Geosynthetics --.

Signed and Sealed this

Twenty-fourth Day of September, 2002

Attest:

Attesting Officer

JAMES E. ROGAN
*Director of the United States Patent and Trademark Office*